(12) United States Patent
Rabus et al.

(10) Patent No.: US 12,583,416 B2
(45) Date of Patent: Mar. 24, 2026

(54) COMPUTER-IMPLEMENTED METHOD FOR AUTOMATED ANALYSIS OF CRASH DATA

(71) Applicant: Dr. Ing. h. c. F. Porsche AG, Stuttgart (DE)

(72) Inventors: Maximilian Rabus, Stuttgart (DE); Mohamed Karim Belaid, Passau (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 23 days.

(21) Appl. No.: 18/773,247

(22) Filed: Jul. 15, 2024

(65) Prior Publication Data

US 2025/0033597 A1 Jan. 30, 2025

(30) Foreign Application Priority Data

Jul. 27, 2023 (DE) ..................... 10 2023 119 887.4

(51) Int. Cl.
B60R 22/48 (2006.01)
B60R 21/015 (2006.01)
(52) U.S. Cl.
CPC .......... B60R 22/48 (2013.01); B60R 21/0155 (2014.10); B60R 2022/4808 (2013.01)
(58) Field of Classification Search
CPC ..... B60R 22/48; B60R 21/0155; B60R 21/01; B60R 2022/4808; G01M 17/0078
USPC .............................................. 701/45, 46, 47
See application file for complete search history.

(56) References Cited

U.S. PATENT DOCUMENTS

| | | | | |
|---|---|---|---|---|
| 5,558,370 A | * | 9/1996 | Behr ..................... | B60R 21/015 |
| | | | | 242/390.8 |
| 10,814,816 B2 | * | 10/2020 | Nagasawa ......... | B60R 21/01552 |
| 2008/0306658 A1 | * | 12/2008 | Beisheim .......... | B60R 21/01516 |
| | | | | 701/46 |

FOREIGN PATENT DOCUMENTS

| | | |
|---|---|---|
| DE | 10 2008 002 243 | 12/2009 |
| DE | 10 2009 000 656 | 8/2010 |
| DE | 10 2013 220 784 | 4/2015 |

* cited by examiner

*Primary Examiner* — Hai H Huynh

(74) *Attorney, Agent, or Firm* — Buchanan Ingersoll & Rooney PC

(57) ABSTRACT

A computer-implemented method for automated evaluation of crash test data includes reading a data set with crash test data from a plurality of available data sets. The method proceeds by extracting from the data set time-dependent force signals that are attributable to a seatbelt tensioner of a passenger restraint system of a vehicle and calculating changes in force $\Delta F_i$ from the force signals at fixed or determinable time intervals between 0.05 ms and 0.15 ms, up to a fixed or determinable time threshold between 20 ms and 30 ms, starting from the time of vehicle impact on the barrier. The method then includes checking whether the force change $\Delta F_i$ reaches or exceeds a fixed or determinable threshold value within the time threshold in at least one of the time intervals.

8 Claims, 2 Drawing Sheets

COMPUTER-IMPLEMENTED METHOD FOR AUTOMATED ANALYSIS OF CRASH DATA

CROSS-REFERENCE TO RELATED APPLICATION

This application claims priority on German Patent Application No 10 2023 119 887.4 filed Jul. 27, 2023, the entire disclosure of which is incorporated herein by reference.

BACKGROUND

Field of the Invention. The invention relates to a computer-implemented method for automated evaluation of crash test data.

Related Art Crash tests with vehicles are performed in the prior art to obtain relevant data, including knowledge about loads on vehicle occupants in the event of a crash. One objective of vehicle development is to design the vehicle structure and the occupant restraint systems to reduce the occupant load in the event of a crash. Crash tests use crash test dummies equipped with sensors. Measurement data obtained from these test dummy sensors during the test provide knowledge about the loads on vehicle occupants in a real crash.

Seatbelt systems are central components of occupant restraint systems. A properly designed seat belt system protects vehicle occupants from being thrown out of the vehicle and from impacting interior components in the event of a crash. Seatbelt systems comprise: a seatbelt that is fixed to the vehicle body by an end fitting; a seatbelt retractor that allows the seatbelt strap to be unwound and wound up; a seatbelt deflector that is often height-adjustable and spaced apart from the seatbelt retractor in the vertical direction of the vehicle; and a seatbelt buckle into which a tongue of the seatbelt strap is inserted during the fastening process.

Modern occupant restraint systems in vehicles also may include seatbelt force limiters as well as seatbelt tensioners. The term "seatbelt tensioner" is intended to mean both a shoulder seatbelt tensioner and a lap seatbelt tensioner in the context of this disclosure.

The known seatbelt force limiters allow the force acting on the shoulder in the event of a crash to be limited by a controlled release of the seatbelt. Thus, the severity of chest injuries of the vehicle occupants can be reduced in an advantageous manner. A single-stage seatbelt force limiter limits the seatbelt force when a design-defined level is exceeded. When using a two-stage seatbelt force limiter, the seatbelt force initially rises to a first force level (for example approximately 4300 N) and subsequently drops to a second level, which is lower than the first level (for example approximately 2600 N). This seatbelt force curve can be achieved by actively switching the seatbelt force limiter between two force levels.

The known shoulder seatbelt tensioners allow an early coupling of a vehicle occupant to the vehicle deceleration by means of a defined retraction of the seatbelt in the seatbelt retractor and thus increase the effectiveness of the seatbelt system. The seatbelt is retracted by ignition of a pyrotechnical propelling charge immediately after the occurrence of a collision, and any seatbelt slack is reduced.

Lap seatbelt tensioners also are known. A pyrotechnic lap seatbelt tensioner can advantageously further improve the coupling of the occupant to the vehicle deceleration in an advantageous manner by an additional seatbelt retraction in the occupant's lap region.

Appropriate calculation models are used during vehicle development to design the vehicle structure and the occupant restraint systems. For example, the models predict the loads on vehicle occupants or crash test dummies in the event of a crash. Artificial intelligence methods, in particular machine learning models, are being used increasingly for this purpose. Changes to the vehicle or to the seatbelt system (e.g. changes to the performance of the force limiters or the seatbelt tensioners) can be made in view of the crash test data.

The results of real crash tests can be stored as data sets in a test database, so that these data sets can also be accessed at a later point in time for evaluation purposes and to provide input for design changes to the vehicle or the seatbelt system. To ensure uniform evaluations and cross-test comparability of crash test data, the data structure, data formats, and details of signal filtering are defined by international standards. For example, the data format for storing and exchanging crash test data is defined in ISO/TS 13499.

Each crash test uses various sensors in the vehicle, in the dummies, and at the collision barrier to collect data in a highly dynamic process. In addition to sensors for acceleration, force, path, angle, and torque measurement in the dummies, acceleration means also are installed on the vehicle structure. In addition, shoulder seatbelt force sensors in the shoulder region often are used to determine the shoulder seatbelt force and, in some cases, lap seatbelt force sensors in the lap region are used to determine the lap seatbelt force of the dummies. The timing and magnitude of force changes in the vehicle or in the driver/passenger/test dummy can vary over small fractions of a second in ways that can affect whether injuries are non-existent or severe. The changes in force dynamics over small fraction of a second cannot realistically be analyzed by a human technician Information on the installed components of the occupant restraint systems has so far only been included in the data sets of crash test data in very general form. The information content in the data sets thus is limited only to the general type, such as rough information of the fastening location, and whether a triggering has taken place. Information about the presence of at least one seatbelt tensioner or seatbelt force limiter is noted only rarely in the comment lines of the crash test data and cannot be extracted reliably due to inconsistent coding. More important details, for example, the ignition times (i.e., triggering) of shoulder seatbelt tensioners or lap seatbelt tensioners or the presence of a seatbelt force limiter, the number and absolute level of the seatbelt force levels for a multi-stage seatbelt force limiter, and the associated change-over times of the seatbelt force limiter, are not explicitly included in the crash test data, as these data depend on the design strategy of the respective vehicle manufacturer and are usually only known to the vehicle manufacturers themselves.

However, accurate knowledge of the properties of the components of occupant restraint systems is required to predict the load and to make intelligent design changes. Thus, it is desirable to be able to automatically extract further information on the installed occupant restraint systems from the crash test data.

The invention therefore is tasked with providing a computer-implemented method and system for automated evaluation of crash test data that enables properties of at least one of the components of an occupant restraint system of a vehicle to be extracted from the crash test data so that design changes can be made.

SUMMARY OF THE INVENTION

The invention relates to a computer-implemented method for automated evaluation of crash test data. The method comprises: reading a data set with crash test data from a plurality of available data sets; extracting time-dependent force signals from the data set that is attributable to a seatbelt tensioner of a passenger restraint system of a vehicle, calculating changes in force $\Delta F_i$ from the force signals at fixed or determinable time intervals; and checking whether the change in force $\Delta F_i$ reaches or exceeds a fixed or determinable threshold value within the time threshold in at least one time interval starting from the time of vehicle impact on a barrier. The time interval of some embodiments is between 0.05 ms and 0.15 ms, preferably at time intervals between 0.08 ms and 0.12 ms, in particular at time intervals of 0.10 ms, up to a fixed or determinable time threshold between 20 ms and 30 ms, preferably up to a time threshold between 23 ms and 27 ms, in particular up to a time threshold of 25 ms. This information can enable the vehicle manufacturer to make design changes to the seatbelt system, such as changes to the time elapsed between the first sign of the crash and the activation of the seat belt tensioner The method enables extraction of further details on the installed seatbelt tensioners of occupant restraint systems from the available crash test data that are not yet directly accessible to the public. Interpreting the force curves in accordance with the method allows for characterization and extraction of individual properties of seatbelt tensioners that are parts of occupant restraint systems. If the change in force $\Delta Fi$ reaches or exceeds the fixed or determinable threshold value within the time threshold in at least one of the time intervals, it can be concluded that a seatbelt tensioner was present in the tested vehicle and was also activated at a certain point in time.

The information obtained in the evaluation of plural data sets by means of the method disclosed can be stored and used, for example, as training data for machine learning models that are used in vehicle development for the design of occupant restraint systems, in particular under the aspect of load prediction and activation times of vehicle tensioners. In addition to using the information in the load prediction by means of artificial intelligence, there is also potential for analysis in the context of accident research.

In one embodiment, the ignition time of the seatbelt tensioner is determined, and is defined by the earliest time at which the change in force $\Delta Fi$ reaches or exceeds the fixed or determinable threshold value.

In some embodiments the threshold value of the change in force $\Delta F_i$ is set to a value of 15 N to 40 N, preferably a value of 20 N to 30 N, in particular a value of 25 N, within the time intervals.

Time-dependent shoulder seatbelt force signals are extracted from the data set and are attributable to a shoulder seatbelt tensioner of the occupant restraint system. Thus, information about the presence and characteristics of a shoulder seatbelt tensioner of the occupant restraint system may be obtained.

In one embodiment, time-dependent lap seatbelt force signals are extracted from the data set and are attributable to a lap seatbelt tensioner of the occupant restraint system. Thus, information about the presence and characteristics of a lap seatbelt tensioner of an occupant restraint system may be obtained and used in improvements to the vehicle or the occupant restraint system.

The system disclosed herein comprises a digital electronic storage medium and a digital processing unit. The digital processing unit can also be referred to as a processor. Instructions are stored in the storage medium. The processing unit is designed to read out and execute the instructions. The instructions are configured to cause the processing unit to perform a method according to an embodiment of the invention when the instructions are executed.

Further features and advantages of the invention will become apparent from the following detailed description with reference to the accompanying figures.

DETAILED DESCRIPTION

Figure 1:
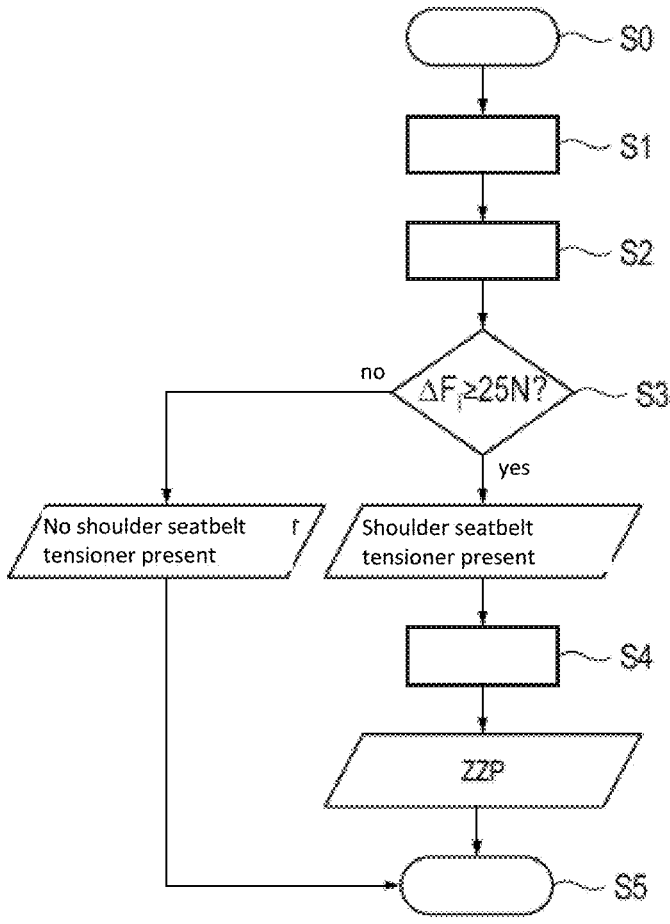
FIG. 1 is a flowchart of a computer-implemented method for automated evaluation of crash test data in order to characterize characteristics of a shoulder seatbelt tensioner of an occupant restraint system of a vehicle.

A computer-implemented method for automated evaluation of crash test data is described with reference to FIG. 1 to characterize a shoulder seatbelt tensioner of an occupant restraint system of a vehicle. The goal here is to determine the presence of a shoulder seatbelt tensioner from the crash test data and the timing of a pyrotechnical triggering of the shoulder seatbelt tensioner. This characterization of the shoulder seatbelt tensioner is based on the measured, time-varying shoulder seatbelt force signal at the shoulder of the dummy that is included in the crash test data. This information can enable changes to the design of the occupant restraint system, such as changes to the time at which the shoulder seatbelt tensioner is activated.

A rapid increase in the seatbelt force curve of the shoulder seatbelt force with a correspondingly high gradient indicates the use of a pyrotechnical shoulder seatbelt tensioner. Modern safety electronics detect the impact of the vehicle shortly after impact with the barrier, so that the shoulder seatbelt tensioner subsequently is triggered. Within a few milliseconds, the seatbelt is retracted to reduce the seatbelt slack and connect the vehicle occupant to the vehicle deceleration earlier. The presence of a shoulder seatbelt tensioner can thus be recognized by the shoulder seatbelt force curve immediately following the impact of the vehicle on the barrier. A rapid increase in shoulder seatbelt force or an increase with a high gradient is characteristic of the presence of a pyrotechnic shoulder seatbelt tensioner.

For automated characterization of the shoulder seatbelt tensioner, the shoulder seatbelt force signal is evaluated in the driver position and/or in the passenger position using the method discussed below. In principle, the method can be used for all vehicle occupants, in particular also for dummies on the second row of seats. A system for performing the method includes a digital electronic storage medium and a digital processing unit. The digital processing unit can also be referred to as a processor. Instructions are stored in the storage medium. The processing unit is designed to read out and execute the instructions. The instructions are configured to cause the processing unit to perform a method when the instructions are executed.

The method starts in a step S0 and proceeds with a step S1 that includes reading a data set with crash test data from plural available data sets that are retrievably stored in a database. This data set is searched for force measurement data on the shoulder seatbelt, so that corresponding time-varying and thus time-dependent shoulder seatbelt force signals that were recorded during the crash test are extracted.

A subsequent step S2 uses the time-dependent shoulder seatbelt force signals to calculate changes in force $\Delta F_i$ at fixed or determinable time intervals up to a fixed or determinable time threshold (beginning with the time of the vehicle impact). Preferably, the time intervals are set to a value between 0.08 ms and 0.12 ms, in particular to a value of 0.10 ms. Other values for the time intervals may also be used, for example, if sensor signals were recorded in the crash test with other sampling intervals. The time threshold preferably is set on the barrier at a value between 23 ms and 27 ms, in particular at a value of 25 ms, starting at the time of vehicle impact. This value of 25 ms is oriented towards the specific crash configuration, in particular the initial speed, which may be, for example, 56 km/h. For other test speeds, the value may need to be adjusted. At a test speed of 40 km/h, a correspondingly adjusted value for the time intervals may be used. In this embodiment, it is to be assumed that the time intervals are set to a value of 0.10 ms and that the time threshold is set to a value of 25 ms.

Step S3 includes checking whether a shoulder seatbelt tensioner is present. This is the case if an increase of the shoulder seatbelt force of 25 N (example threshold value of the change in force) or more can be determined in the shoulder seatbelt force signals within a time interval of 0.1 ms within the time threshold and thus in the first 25 ms of the crash test following the vehicle impact on the barrier. If this condition is not met, it may be inferred that a shoulder seatbelt tensioner is not present and the method is ended (step S5). If the condition is fulfilled and thus a shoulder seatbelt tensioner is present, then the ignition time ZZP of the shoulder seatbelt tensioner is determined in a step S4. The ignition time ZTP is defined by the earliest time at which: $\Delta F_i \geq 25$ N. After determining the ignition time ZZP, the method is ended (step S5).

Figure 2:
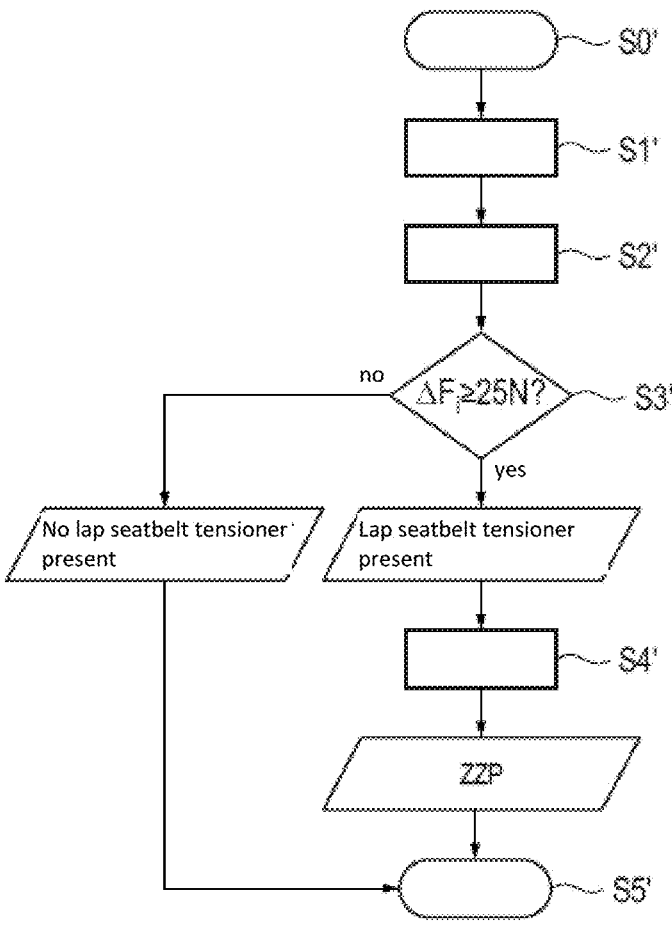
FIG. 2 is a flowchart of a computer-implemented method for automated evaluation of crash test data to characterize characteristics of a lap seatbelt tensioner of an occupant restraint system of a vehicle.

A computer-implemented method for automated evaluation of crash test data is explained below with reference to FIG. 2, and allows characteristics of a pyrotechnic lap seatbelt tensioner of an occupant restraint system of a vehicle to be characterized. The lap seatbelt tensioner is characterized in the same way as the shoulder seatbelt tensioner described above with reference to FIG. 1, but is based on the measured seatbelt force signal at the dummy's lap.

The method starts at step S0' and in step S1' reads a data set with crash test data from plural available data sets that are stored retrievably in a database. This data set is searched for force measurement data on the lap seatbelt, so that corresponding time-varying and thus time-dependent lap seatbelt force signals that were recorded during the crash test are extracted.

In a subsequent step S2', changes in force $\Delta F_i$ at fixed or determinable time intervals up to a fixed or determinable time threshold are calculated from the time-dependent lap seatbelt force signals. Preferably, the time intervals are set to a value between 0.08 ms and 0.12 ms, in particular to a value of 0.10 ms. Other values for the time intervals may also be used here, for example, if sensor signals were recorded in the crash test with other sampling intervals. The time threshold is preferably set on the barrier at a value between 23 ms and 27 ms, in particular at a value of 25 ms, starting at the time of vehicle impact. This value of 25 ms is particularly oriented towards the specific crash configuration, in particular the initial speed, which may be, for example, 56 km/h. For other test speeds, the value may need to be adjusted. At a test speed of 40 km/h, a correspondingly adjusted value for the time intervals may be used. In this embodiment, it is again assumed that the time intervals are set to a value of 0.10 ms and that the time threshold is set to a value of 25 ms.

Step S3' checks whether a lap seatbelt tensioner is present. This is the case if an increase of the lap seatbelt force of 25 N (example threshold value of the change in force) or more can be determined in the lap seatbelt force signals within a time interval of 0.1 ms within the time threshold and thus in the first 25 ms of the crash test following the vehicle impact on the barrier. If this condition is not met, it may be inferred that a lap seatbelt tensioner is not present and the method is ended (step S5'). If the condition is fulfilled and thus a lap seatbelt tensioner is present, the ignition time ZZP of the lap seatbelt tensioner is determined in a step S4'. The ignition time ZTP is defined by the earliest time at which: $\Delta F_i \geq 25$ N. After determining the ignition time ZZP, the method is ended (step S5'). Analysis of these data enable the activation time of the seatbelt tensioner to be changed and can lead to other design changes to the occupant restraint system.

It should be noted at this point that the method steps explained in the two exemplary embodiments may also be performed along with the same crash test data set when it comes to obtaining information about a shoulder seatbelt force limiter and a lap seatbelt force limiter of the occupant restraint system. The information obtained in the analysis of plural data sets can be stored and used, for example, as training data for machine learning models that are used in vehicle development for the design of occupant restraint systems, in particular under the aspect of load prediction. In addition to using the information in the load prediction, in particular by means of artificial intelligence, there is also potential for analysis in the context of accident research.

The invention claimed is:

1. A computer-implemented method for automated evaluation of crash test data comprising the steps of:
   reading a data set with crash test data from a plurality of available data sets;
   extracting from the data set time-dependent force signals that are attributable to a seatbelt tensioner of a passenger restraint system of a vehicle;
   calculating changes in force $\Delta F_i$ from the force signals at fixed or determinable time intervals between 0.05 ms and 0.15 ms, up to a time threshold between 23 ms and 27 ms starting from a time of vehicle impact on the barrier;
   checking whether the change in force $\Delta F_i$ reaches or exceeds a fixed or determinable threshold value within the time threshold in at least one of the time intervals for determining activation of the seatbelt tensioner; and
   changing at least one component of the passenger restraint system based at least partly on a determination in the checking step that the seatbelt tensioner was present and activated.

2. The computer-implemented method of claim 1, further comprising changing the at least one component of the passenger restraint system based further on magnitudes and timing of the force $\Delta F_i$ relative to fixed or determinable threshold values within the time threshold.

3. The computer-implement method of claim 2, wherein changing at least one component of the passenger restraint system comprises changing an activation time for activating the seat belt tensioner based partly upon an elapsed time between the time of the vehicle impact on the barrier and a time at which activation of the seatbelt tensioner was determined to occur.

4. The computer-implemented method of claim 1, wherein determining an ignition time of the seatbelt tensioner comprises determining an earliest time at which the change in force $\Delta F_i$ reaches or exceeds the fixed or determinable threshold value.

5. The computer-implemented method of claim 1, wherein the threshold value of the change in force $\Delta F_i$ is set to a value of 15 to 40 N, within the time interval.

6. The computer-implemented method of claim 1, further comprising extracting from the data set time-dependent shoulder seatbelt force signals that are attributable to a shoulder seatbelt tensioner of the passenger restraint system.

7. The computer-implemented method of claim 1, further comprising extracting from the data set time-dependent lap seatbelt force signals that are attributable to a lap seatbelt tensioner of the passenger restraint system.

8. A system comprising a digital electronic storage medium that stores instructions and a digital processing unit that is designed to read out and execute the instructions, wherein the instructions are designed such that, when the instructions are executed, the processing unit is prompted to perform the method of claim 1.

\*   \*   \*   \*   \*